Jan. 31, 1961  A. M. BASSETT  2,969,767
PET BAG
Filed April 2, 1958

Alice M. Bassett
INVENTOR.

BY
Attorneys 2,969,767
PET BAG

Alice M. Bassett, 1437 W. 98th St., Los Angeles 47, Calif.

Filed Apr. 2, 1958, Ser. No. 725,962

3 Claims. (Cl. 119—1)

This invention relates in general to new and useful improvements in accessories for pets, and more specifically to a pet transporting device in the form of a pet bag.

In many instances it is desired to transport pets which are not accustomed to being transported. If a cage is utilized, the pet has a tendency to hurt itself attempting to gain its freedom from the cage. On the other hand, if one attempts to hold the pet, in many instances it is necessary to hold the pet so firmly that the pet is injured or on the other hand, if the pet is loosely held, the pet will scratch or bite the holder. This, of course, is undesirable.

The primary object of this invention is to provide a pet transporting device in the form of a pet bag, the bag being of such a construction whereby the movement of the pet is limited and at the same time the pet is not cramped and thus is comfortable, the pet being entirely within the bag with the exception of the neck and head of the pet which is left free so that the pet may remain calm.

Another object of this invention is to provide an improved pet bag for transporting pets, such as cats, the pet bag being in the form of an elongated bag having a longitudinally extending opening in the upper surface thereof, closure means for closing a substantial part of the opening once the pet has been placed into the pet bag, and means carried by the pet bag at the unclosed end of the opening for securing the pet's head within the unclosed end of the opening.

A further object of this invention is to provide a pet bag, the pet bag being of a pleasing appearance whereby when used, the pet and the bag will be attractive appearing, the pet bag at the same time being formed of foldable material whereby it may be readily stored when not in use thus not requiring the space normally occupied by boxes and other types of pet transporting devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
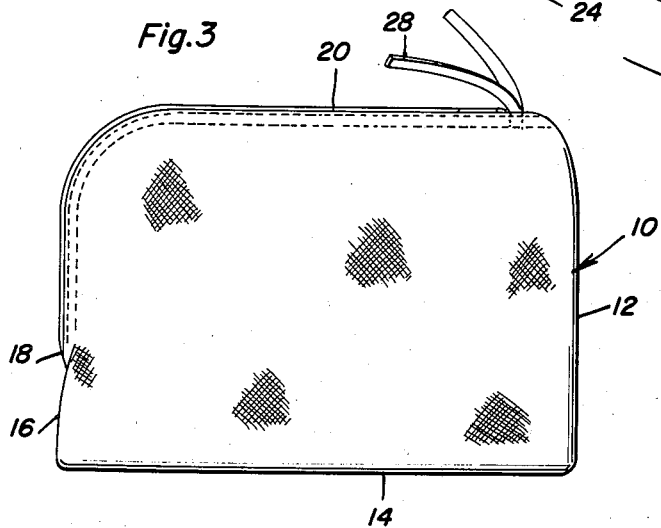
Figure 3 is a plan view of the pet bag when folded for storage and shows the general outline thereof, the view being on a reduced scale.

Referring now to the drawings in detail, it will be seen that there is illustrated the pet bag, which is the subject of this invention, the pet bag being referred to in general by the reference numeral 10. The pet bag 10 is generally rectangular in outline, as is best shown in Figure 3 and is formed of a single piece of material which may be either stitched together along the edge 12 or along the edge 14, as is desired. The edge 16 of the pet bag 10, which is disposed opposite to the edge 12 has an opening 18 therein which extends up through the edge 20 which is disposed opposite to the edge 14. The opening 18 is closed by means of a slide fastener which is referred to in general by the reference numeral 22.

The slide fastener 22 may be of any type and if desired the locking strips 24 thereof may be in the form of plastic strips which interlock or may be in the form of interlocking teeth, both of which types are conventional. The slide fastener 22 also includes a slide member 26 for moving the locking strips 24 into and out of locking engagement.

Figure 1:
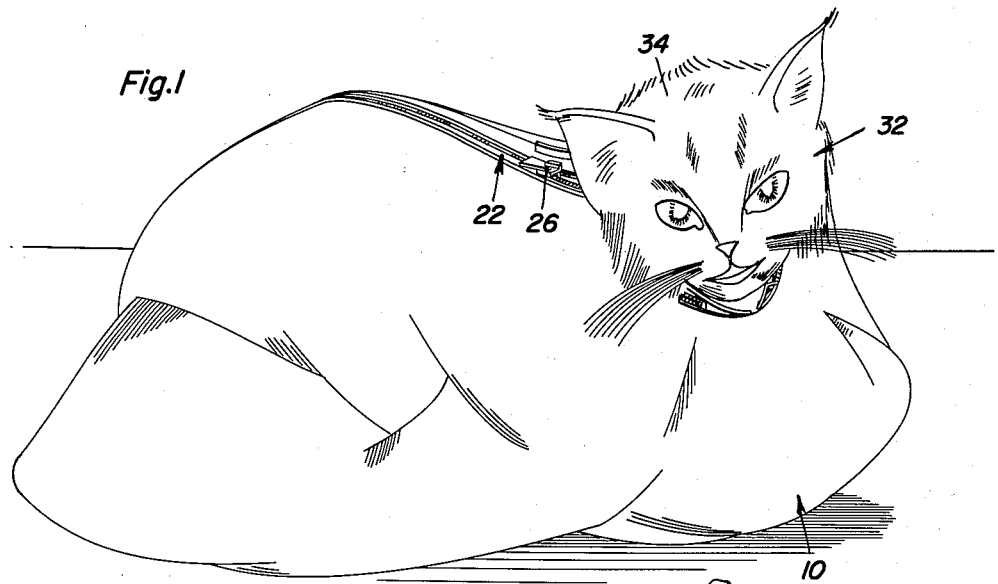
Figure 1 is a perspective view of the pet bag, which is the subject of this invention, and shows the pet bag in use.
Figure 2:
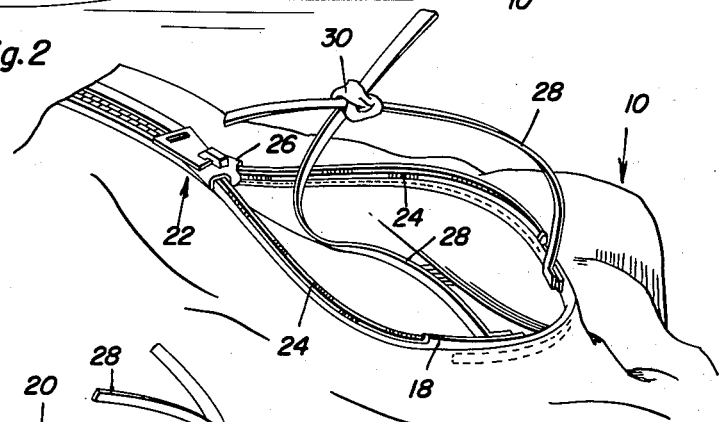
Figure 2 is an enlarged fragmentary perspective view of the pet bag at an upper end thereof.

It is to be noted that the locking strips 24 terminate short of one end of the opening 18, this end being disposed uppermost and at one end of the bag 10, as is best shown in Figures 1 and 2. Secured to the bag 10 along the opening 18 in that portion thereof not receiving the strips 24 are tie straps 28. The tie straps 28 are intended to pass around the neck of a pet to be transported and tied behind the head thereof. Any type of knot, such as the knot 30 may be used to tie the tie straps 28 together.

The pet bag 10 may be of any construction and the material may be of any design. In certain instances it may be desirable that the material from which the pet bag 10 is formed match the wearing apparel of the owner of the pet. Also, the pet bag 10 may be suitably lined for the comfort of the pet.

As is best shown in Figure 1, the pet bag is being used for the purpose of transporting a cat 32. The cat 32 is placed into the pet bag 10 when the opening 18 is fully opened at which time the slide member 26 is disposed at the end of the opening 18 remote from the tie straps 28. Thus the placing of the pet into the pet bag 10 may be readily facilitated without injuring the pet.

Once the pet has been positioned within the pet bag 10, the slide fastener 22 is actuated so as to completely encase the pet so that only the head thereof extends as in the case of the head 34 of the cat 32, as is best illustrated in Figure 1. The slide fastener 22 is then closed to the extent that the slide member 26 is disposed in a position slightly rearwardly of the head 34 of the pet. At this time the tie straps 28 are positioned around the neck of the pet 32 and the tie straps 28 knotted as at 30 behind the pet's head 34. This time the pet is securely disposed within the pet bag 10.

From the description of the pet bag 10, it will be seen that the pet is comfortably disposed within the pet bag and at the same time will not become panicky because its head extends exteriorly of the pet bag 10 and thus it may view its surroundings. Further, because of the flexibility of the pet bag 10, freedom of movement of the pet within the pet bag 10 is permitted, at the same time the pet being protected against harm due to rough edges or other harmful elements of pet cages or cases.

It is to understood that the pet bag 10 may not only be formed of different materials, but may also vary in size depending upon the particular pet to be transported. Although a cat has been illustrated, at times it may be desirable to carry small dogs or other similar animals.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pet transporting device comprising a substantially rectangular bag having a bottom, top, sides and front and rear portions, said front portion being permanently closed, said bag having a lengthwise opening therein extending along said top portion and partway along the rear end for insertion of a pet therethrough into the bag, said bag having opposite edges forming said opening and extending from the closed front end, a slide fastener mounted on said edges for closing said opening, said slide fastener being spaced from said closed end to provide for the head and neck of a pet extending out of said opening at said closed end of the bag, and strap means secured to said edges at the closed end of the bag for securing around a pet's neck extending out of said opening.

2. A pet transporting device according to claim 1, said strap means comprising separate tie straps secured at one end thereof to said edges.

3. For use in confining, safely handling, carrying and transporting a cat, small dog, or similar pet; a jacketing and restraining bag, said bag being made of launderable cloth suitable for intended purposes, being full-fashioned to confine all but the head and neck of the pet without subjecting the pet to undesirable strait-jacket restraint, said bag embodying, when in use, bottom, top, side and front and rear end portions, said bag having a centrally disposed lengthwise entrance and exit opening ranging from the rear end portion just above the bottom portion, along the center of the top portion and having a front end rounded and terminating at the juncture of the upper central part of the front end and cooperating front end of the top portion, said terminal junctional end providing a conformable neck-embracing collar, a pair of tie straps having lower ends secured to opposed edges of the rounded front end of the opening and spaced a short distance apart, said straps adapted to be drawn across diametrically opposite sides of the pet's neck so that the free upper ends may be tied together, and manually actuated fastening means carried by lengthwise edges of the top portion bordering said entrance and exit opening, the forward end of the fastening means terminating rearwardly of and being spaced from the attached lower ends of said tie straps.

References Cited in the file of this patent

UNITED STATES PATENTS

| | | |
|---|---|---|
| 1,731,824 | Mood | Oct. 5, 1929 |
| 2,032,248 | Bins | Feb. 25, 1936 |
| 2,234,546 | Basch | Mar. 11, 1941 |
| 2,246,100 | Marzani | June 17, 1941 |
| 2,535,394 | Davis | Dec. 26, 1950 |
| 2,717,620 | Renz | Sept. 13, 1955 |

OTHER REFERENCES

Wash. Herald Newspaper, Magazine Section, page 12, December 4, 1938.